(12) United States Patent  
Nishiwaki et al.

(10) Patent No.: US 6,215,086 B1
(45) Date of Patent: Apr. 10, 2001

(54) RESISTANCE WELDING CONTROLLER

(75) Inventors: Yukio Nishiwaki, Nishikasugai; Yoshikatu Endo, Nagoya, both of (JP)

(73) Assignees: Welding/Technology Corp., Carol Stream, IL (US); Nadex Co., Ltd., Nagoya (JP)

( * ) Notice: Subject to any disclaimer, the term of this patent is extended or adjusted under 35 U.S.C. 154(b) by 0 days.

(21) Appl. No.: 09/390,065

(22) Filed: Sep. 4, 1999

Related U.S. Application Data

(60) Provisional application No. 60/113,705, filed on Dec. 24, 1998.

(51) Int. Cl.[7] ..................................................... B23K 11/24
(52) U.S. Cl. ............................................................. 219/108
(58) Field of Search ..................................... 219/110, 108, 219/117.1

(56) References Cited

U.S. PATENT DOCUMENTS

| | | | |
|---|---|---|---|
| 4,503,316 | 3/1985 | Murase et al. | 219/130.32 |
| 4,763,237 | 8/1988 | Wieczorek | 363/20 |
| 5,171,960 | * 12/1992 | Takano et al. | 219/108 |
| 5,196,668 | 3/1993 | Kobayashi et al. | 219/110 |
| 5,406,045 | * 4/1995 | Kiriishi et al. | 219/110 |
| 5,560,842 | * 10/1996 | Kitaguchi et al. | 219/108 |
| 5,589,088 | 12/1996 | Boilard | 219/110 |
| 5,945,011 | * 8/1999 | Takano et al. | 219/108 |

* cited by examiner

Primary Examiner—Clifford C. Shaw
(74) Attorney, Agent, or Firm—Kenneth A. Benson

(57) ABSTRACT

A resistance welding controller for supplying a substantially constant level of AC current to a resistance welder is provided. In one embodiment, the resistance welding controller automatically switches modes to provide compatibility with both AC and DC resistance welders.

9 Claims, 13 Drawing Sheets

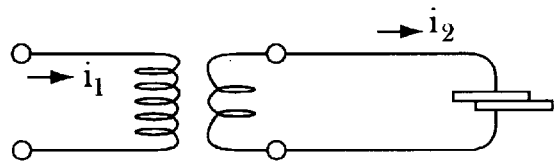
Fig. 12A
Fig. 12B
(Prior Art)
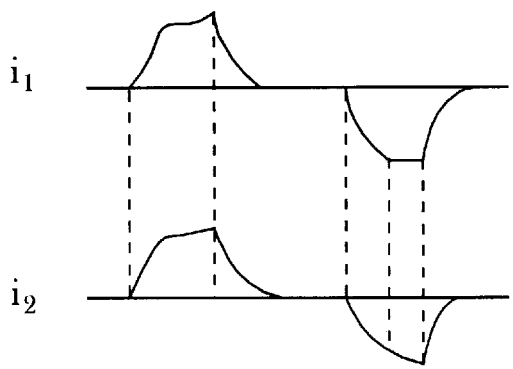
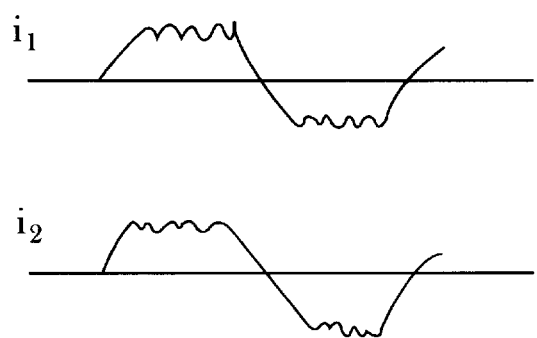
Fig. 12C

RESISTANCE WELDING CONTROLLER

This application claims the benefit of provisional application Ser. No. 60/113,705 filed Dec. 24, 1998.

BACKGROUND OF THE INVENTION

The present invention relates to a resistance welding controller which supplies a given level of alternating ("AC") current to a resistance welder.

A resistance welder welds a workpiece sandwiched between two electrodes as current flows. The current flow heats the workpiece and forms a molten metal weld "nugget." After the welding current stops flowing, the weld nugget solidifies to form the weld.

There are two types of resistance welders: AC and direct ("DC") current. A DC resistance welder and an associated resistance welding controller provide the advantage that the current supplied to resistance welder (and, in turn, to the electrodes) can be controlled within stringent limits. However, there are two major disadvantages: the equipment required is expensive and the electrodes wear out quickly because current flows in one direction only during welding. In contrast, an AC resistance welder and an associated resistance welding controller provide the advantages that the equipment required is inexpensive and the electrodes wear out very slowly. However, a disadvantage is that current supplied to the AC resistance welder 80 (and, in turn, to the electrodes) can be controlled only within fairly loose limits.

One way to control both types of resistance welders is to install a separate resistance welding controller for each. However, having two separate controllers is costly.

In view of the foregoing, it would be desirable to provide a resistance welding controller which can control both AC and DC resistance welders while using electricity efficiently and improving welding performance.

SUMMARY OF THE INVENTION

An object of the present invention is to provide a resistance welding controller which can control both AC and DC resistance welders while using electricity efficiently and improving welding performance.

The disadvantages and limitations of previous resistance welder controllers are overcome by the present invention which provides a resistance welding controller for supplying a substantially constant level of AC current to a resistance welder.

In one embodiment, the resistance welding controller automatically switches modes to provide compatibility with both AC and DC resistance welders. Operators are not required to visually check the type of the resistance welder and switch the mode, making the welder easier to use.

BRIEF DESCRIPTION OF THE DRAWINGS

The above and other objects and advantages of the invention will be apparent upon consideration of the following detailed description, taken in conjunction with the accompanying drawings, in which reference characters refer to like parts throughout and in which:

FIG. 12A shows a portion of an AC resistance welder.

FIG. 12B shows AC resistance welder primary and secondary current waveforms obtained by the pulse width modulation (PWM) method according to the prior art.

FIG. 12C shows AC resistance welder primary and secondary current waveforms shaped in trapezoid according to the present invention.

DETAILED DESCRIPTION OF THE INVENTION

Figure 1:
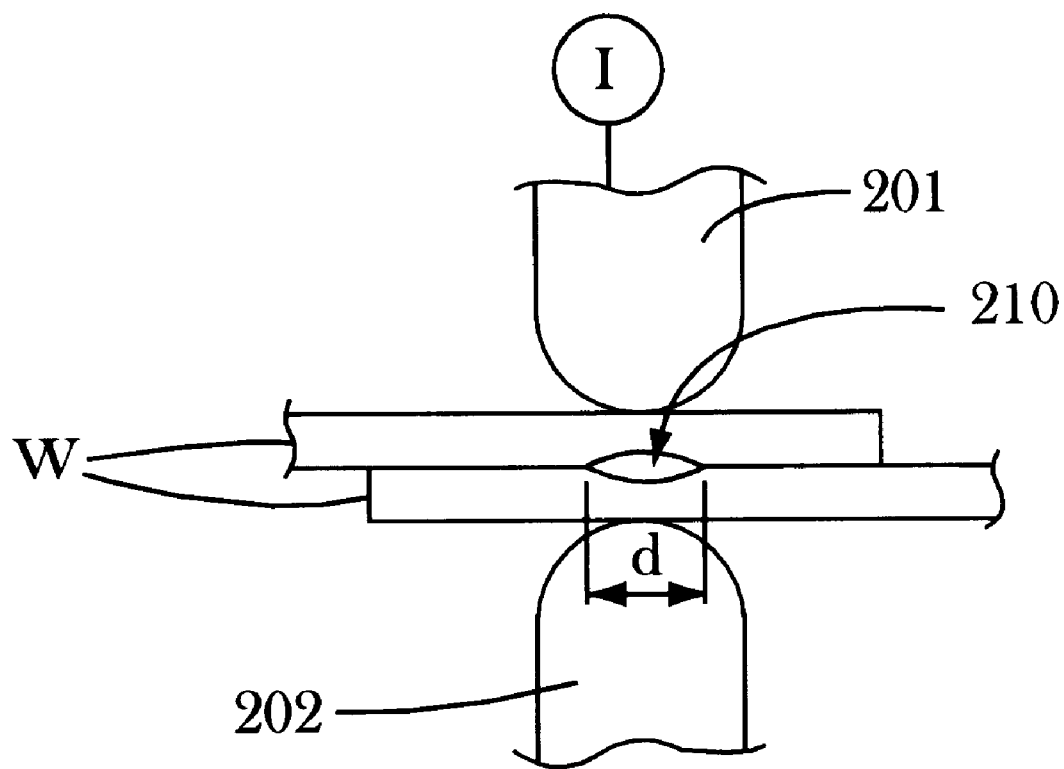
FIG. 1 illustrates the principles of resistance welding.

The principle of resistance welding is described with respect to FIG. 1. A "nugget" 210 is the melted portion of workpieces W, W. In principle, the best welding performance is provided by the largest nugget 210 (in mm diameter) produced with uniform repeatability. As shown in FIG. 1, a large current I of preferably about 10,000 A is applied via electrodes 201, 202 to workpieces W, W for preferably about 0.2–0.3 seconds. Heat is generated between the two workpieces and portions of them are melted, thereby forming nugget 210.

Figure 2:
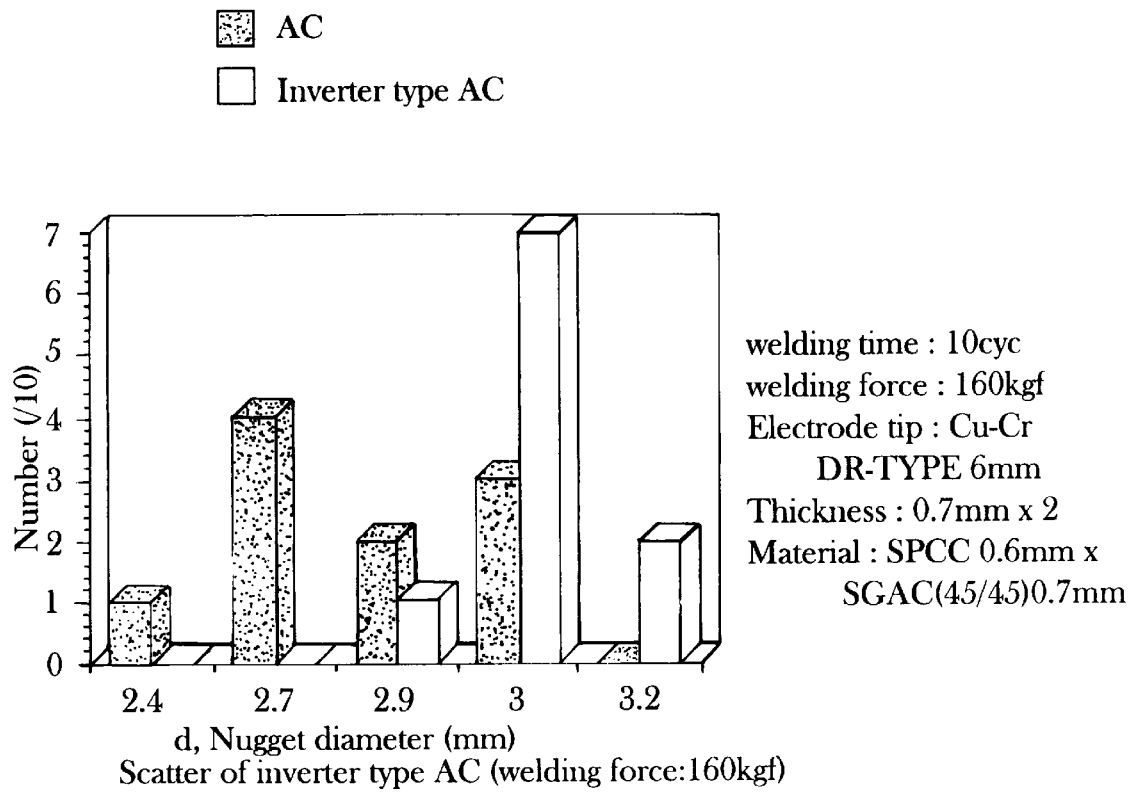
FIG. 2 shows a comparison of the welding performance between the present invention and the conventional technology.

A comparison of the welding performance between the present invention and the conventional technology is shown in FIG. 2. As shown in FIG. 2, the present invention, represented by the inverter type AC controller, provides larger nuggets with uniform repeatability. As described herein, the present invention provides excellent welding performance.

Figure 3:
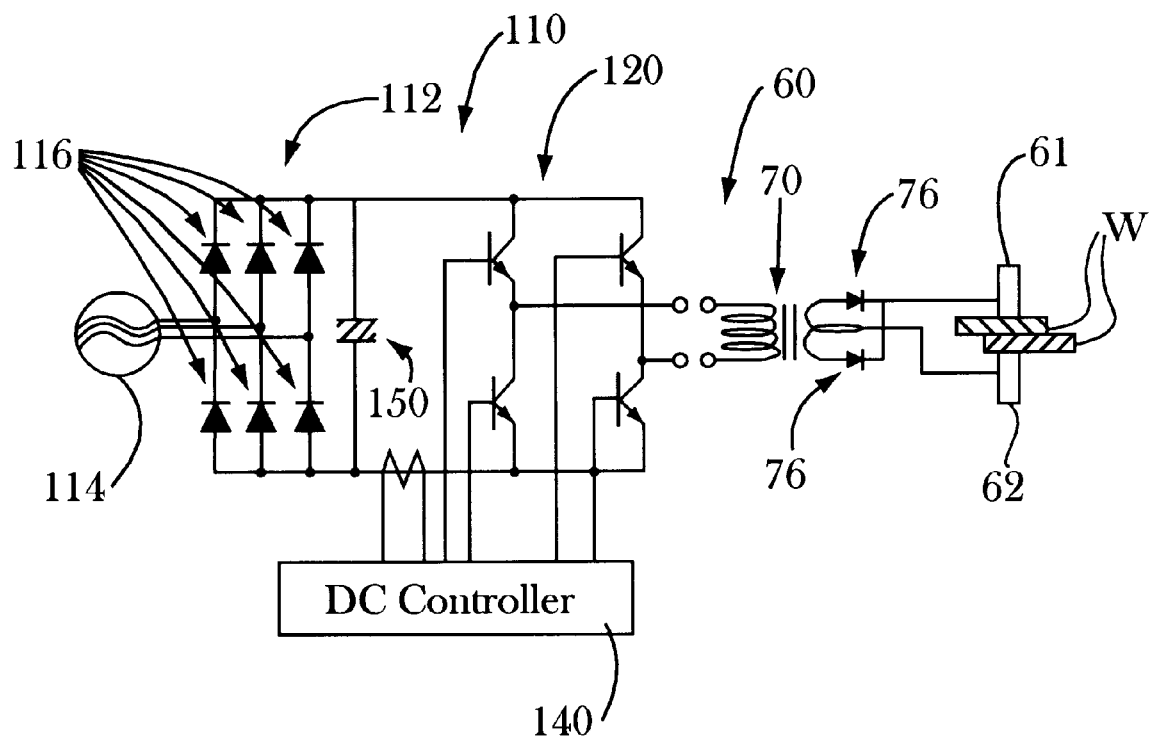
FIG. 3 is a circuit showing a DC resistance welding controller.

FIG. 3 shows a DC resistance welder 60. Transformer 70 and a pair of diodes 76 convert AC current supplied by resistance welding controller 110 to DC current such that DC current flows between two electrodes 61, 62. DC resistance welder 60 uses resistance welding controller 110 of the following specification as shown in FIG. 3. DC resistance welding controller 110 comprises power supply 112, which is made up of three phase power supply 114 and diodes 116. Inverter 120 and capacitor 150 are connected in parallel with power supply 112. AC current from inverter 120 is supplied to resistance welder 60. DC controller 140 controls the ON/OFF operation of each of the transistors constituting inverter 120, thereby supplying a given level of AC current to DC resistance welder 60.

Figure 4:
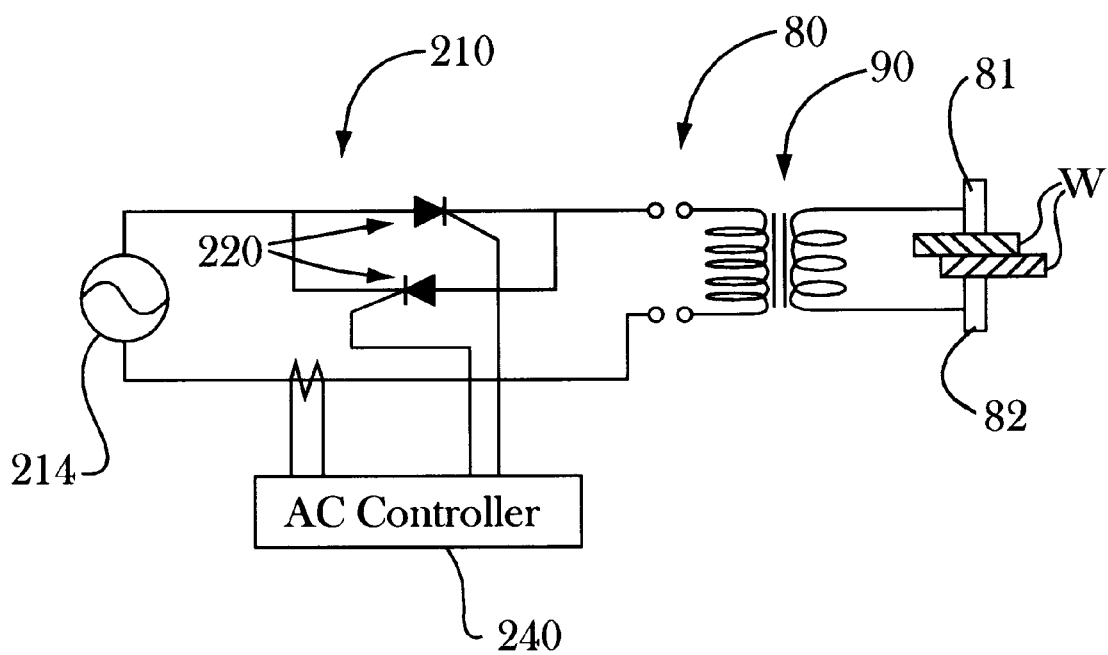
FIG. 4 is a circuit showing an AC resistance welding controller.

FIG. 4 shows an AC resistance welder 80. Transformer 90 transforms AC current supplied by resistance welding controller 210 such that AC current flows between two electrodes 81, 82 without AC/DC conversion. The second type (hereafter referred to as AC) resistance welder 80 uses AC resistance welding controller 210 of the following specification as shown in FIG. 4. Thyristors 220 are connected such that AC current is supplied to AC resistance welder 80 from power supply 214. AC controller 240 controls each of the thyristors 220, thereby supplying a given level of AC current to AC controller 240.

The frequency that DC resistance welding controller 110 supplies to DC resistance welder 60 is as much as 10 times higher than AC resistance welding controller 210 supplies to AC resistance welder 80.

Figure 5:
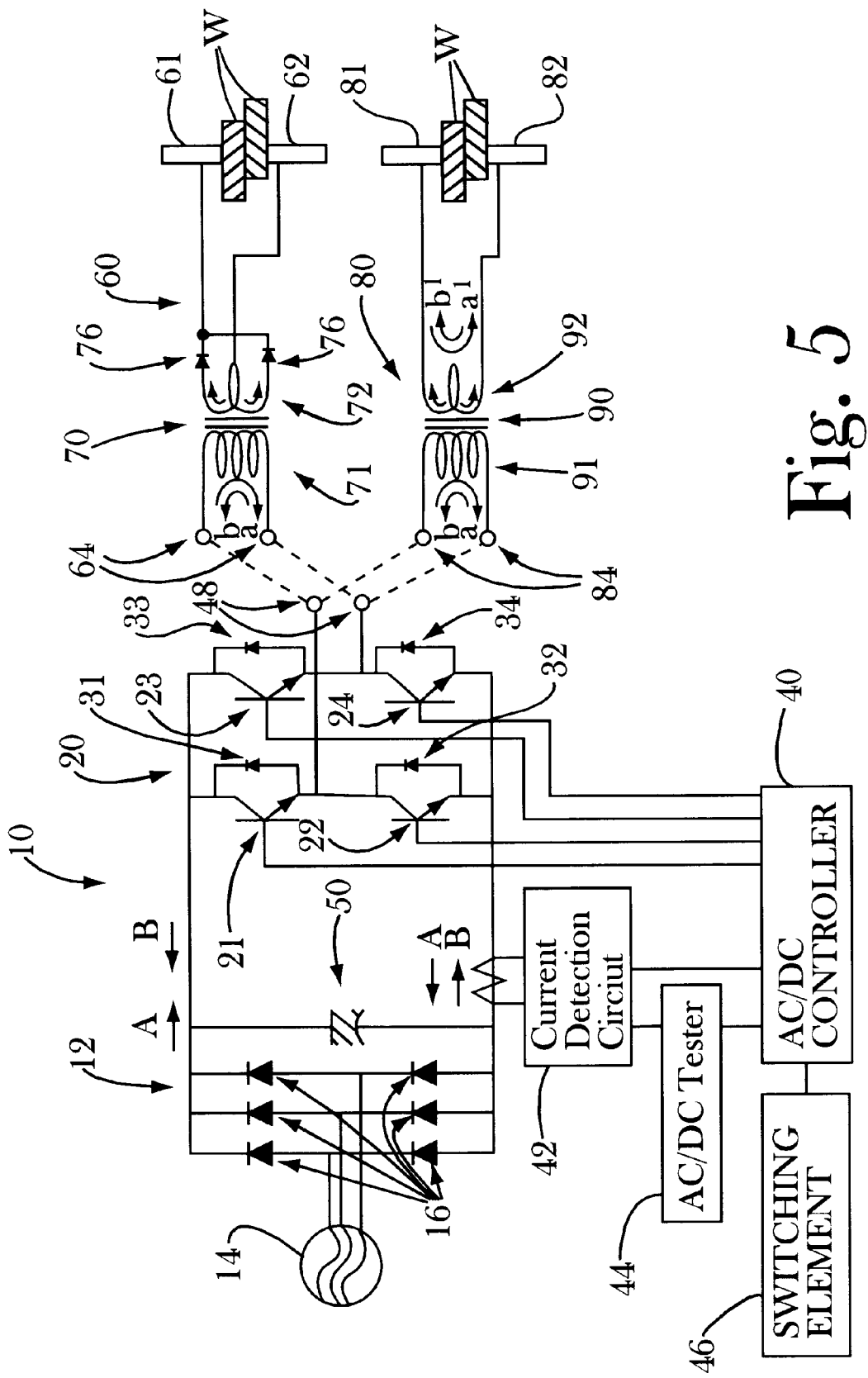
FIG. 5 is a circuit showing a resistance welding controller capable of switching between AC and DC modes according to the present invention.

As shown in FIG. 5, resistance welding controller 10 may be coupled to either DC resistance welder 60 or AC resistance welder 80 for supplying a given level of AC current. Resistance welding controller 10 comprises: power supply 12, inverter 20, AC/DC controller 40, a pair of resistance welder connection terminals 48, and capacitor 50.

Power supply 12 comprises: three phase power supply 14 and diodes 16.

Inverter 20 and capacitor 50 are arranged in parallel with power supply 12. Inverter 20 comprises four transistors 21, 22, 23, 24.

Groups consisting of first and second transistors 21, 22 and third and fourth transistors 23, 24 are connected in parallel with power supply 12. First transistor 21 and second transistor 22 are connected in series with power supply 12. Third transistor 23 and fourth transistor 24 are also connected in series with power supply 12. Current flows through transistors 21, 22, 23, 24 in the same direction. The bases of each of transistors 21, 22, 23, 24 are connected to AC/DC controller 40.

Diodes 31, 32, 33, 34 are connected in parallel with transistors 21, 22, 23, 24, respectively. Current flows through transistors 21, 22, 23, 24 inversely with respect to diodes 31, 32, 33, 34, respectively.

A pair of resistance welder connecting terminals 48 are connected between first transistor 21 and second transistor 22 and between third transistor 23 and fourth transistor 24.

Current detection circuit 42 is coupled to the lead connecting power supply 12 and inverter 20. Current detection circuit 42 is also coupled to AC/DC tester 44. AC/DC tester 44 is coupled to AC/DC controller 40. AC/DC controller 40 is coupled to switching element 46.

DC resistance welder 60 comprises a pair of electrodes (first electrode 61 and second electrode 62) and controller connection terminals 64. Transformer 70 is connected to controller connection terminals 64. Both sides of the secondary coil 72 of transformer 70 are connected to first electrode 61 via diode 76 located in the direction of the first electrode 61. The center of secondary coil 72 is connected to second electrode 62.

AC resistance welder 80 comprises a pair of electrodes (first electrode 81 and second electrode 82) and controller connection terminals 84. Controller connection terminals 84 are connected to transformer 90. One side of secondary coil 92 of transformer 90 is connected to the first electrode 81. The other side of secondary coil 92 is connected to second electrode 82.

Resistance welding controller 10 supplies a given level of AC current to each of the resistance welders 60 and 80 when controller connection terminals 64, 84 are connected to resistance welder connection terminals 48 of resistance welding controller 10.

Manual Operation

The manual operation of the resistance welding controller shown in FIG. 5 is described herein.

For DC resistance welding, switching element 46 turns on the DC mode and resistance welding controller 10 supplies AC current of preferably about 400–1200 Hz to DC resistance welder 60.

AC/DC controller 40 causes resistance welding controller 10 to cycle through the following four states at the above frequencies: first and fourth transistors 21, 24 are ON; second and third transistors 22, 23 are OFF (hereafter referred to as the first state); all transistors 21, 22, 23, 24 are OFF (hereafter referred to as the second state): second and third transistors 22, 23 are ON; first and fourth transistors 21, 24 are OFF (hereafter referred to as the third state); and all transistors 21, 22, 23, 24 are OFF (hereafter referred to as the fourth state).

In the first state, current flows in the following order: power supply 12, first transistor 21, primary coil 71, forth transistor 24, and power supply 12.

In primary coil 71, current flows from the upper level to lower level, as shown in FIG. 5. This is referred to as the a-direction.

In the third state, current flows in the following order: power supply 12, third transistor 23, primary coil 71, second transistor 22, and power supply 12.

In primary coil 71, current flows to the upper level from lower level in the drawing. This is referred to as the b-direction.

A given level of high frequency AC current is supplied to DC resistance welder 60 (secondary coil 72 side) in the above manner.

For DC resistance welding, workpieces W, W (sandwiched between electrodes 61 and 62) are welded together by the above AC current which flows on the secondary coil 72 side in DC resistance welder 60 in the loop comprising: one end of secondary coil 72, first electrode 61, second electrode 62, the center portion of secondary coil 72, the other end of secondary coil 72, and first electrode 61.

For AC resistance welding, switching element 46 turns on the AC mode and resistance welding controller 10 supplies AC current of preferably about 50 or 60 Hz. AC/DC controller 40 alternately provides two states: the first state (first and fourth transistors 21, 24 are ON) and the third state (second and third transistors 22, 23 are ON) at the above frequencies in resistance welding controller 10, supplying AC current of preferably about 50–60 Hz to AC resistance welder 80. For AC resistance welder 80, both transistors 21, 24 (or 22, 23) are duty-controlled to continuously switch on and off. As a result, the AC current assumes a generally rectangular wave form. Workpieces W, W (sandwiched between first electrode 81 and second electrode 82 of AC resistance welder 80) are welded together by the above AC current supplied in the above manner.

Each of the current flows that can occur in primary coil 91 is referred to as the a- or b-direction and the corresponding current flows that can occur in secondary coil 92 are referred to as the a'- or b'-direction.

Automatic Operation

AC/DC controller 40 alternately provides the first, second, third, and fourth states at a given frequency. Current detection circuit 42 detects different levels of current for DC and AC resistance welders 60 and 80.

Figure 6:
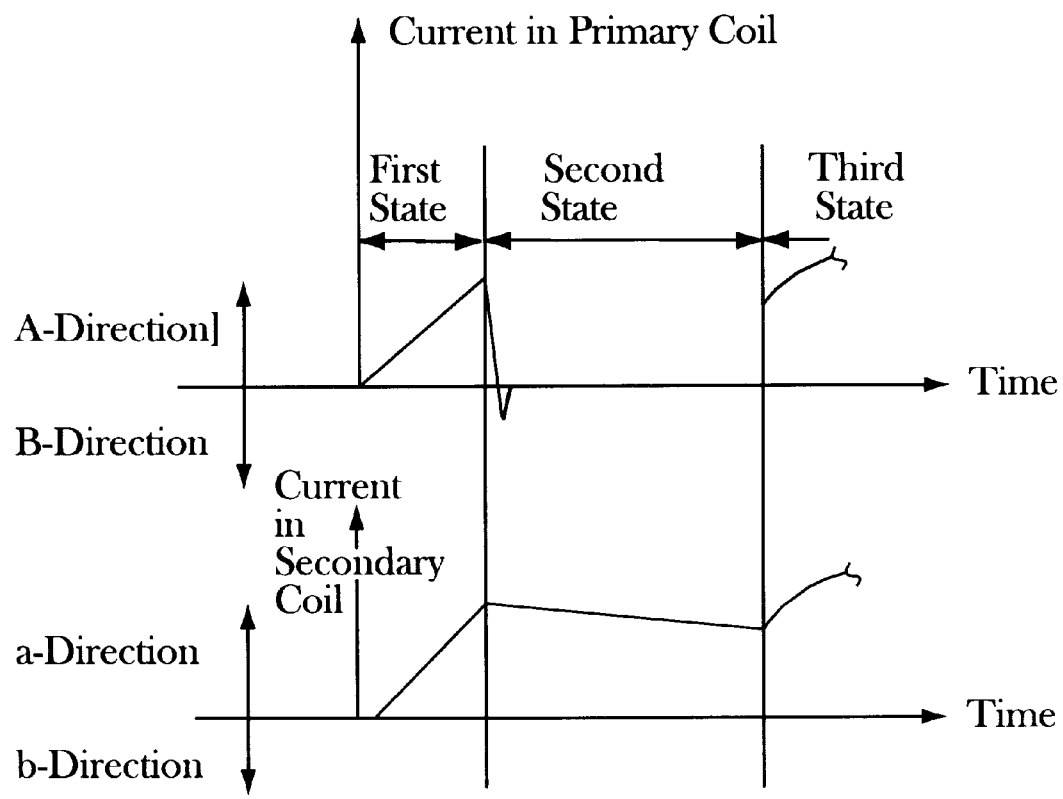
FIG. 6 is a diagram showing the current in the primary and secondary coils when an AC resistance welding controller is connected to a resistance welder.

The operation of AC resistance welder 80 is shown in FIG. 6. In the first state (first and fourth transistors 21, 24 are ON), the current level gradually increases from zero as current flows through current detection circuit 42 in the following order: power supply 12, first transistor 21, primary coil 91 (a-direction), fourth transistor 24, and power supply 12. Current taken by the coil in the current detection circuit 24 causes the current level to increase gradually. The current level of current flowing in the a'-direction also increases gradually from zero for the same reason.

Note that the current flow from left to right through current detection circuit 42 (i.e., the lead portion at which current detection circuit 42 measures current gain) is referred to as the A direction. The reverse current flow is referred to as the B direction. In this case, current flows in the A-direction.

The sequence goes to the second state (all transistors 21, 22, 23, 24 are OFF). Current flowing through primary coil 91 of transformer 90 is interrupted. However, current remaining in the secondary coil 92 continues flowing to the secondary coil 92 side of transformer 90 in the a'-direction, inducing current flowing through primary coil 91 in the a-direction without interruption.

On the primary coil 91 side, current flows in the following order as capacitor 50 is charged: primary coil 91, third diode 33, capacitor 50, second diode 32, and primary coil 91.

Current flows past current detection circuit 42 in the B-direction. The current level gradually decreases as capacitor 50 is charged. Current stops flowing to both the first and second coil sides when capacitor 50 is charged completely.

For AC resistance welder 80, in the second state, current remains in a loop including not only the secondary coil 92 side of transformer 90 but also the primary coil 91 side (including resistance welding controller 10) as described. The current stops flowing when capacitor 50 is charged completely.

The sequence goes to the third state (second and third transistors 22 and 23 are ON). The current level gradually increases from zero in the same manner as in the first state, as current flows through current detection circuit 42 in the A-direction (from power supply 12 to third transistor 23 to primary coil 91 (b-direction) to second transistor 22 to power supply 12). The current level of current flowing in the b'-direction also increases gradually from zero.

Figure 7:
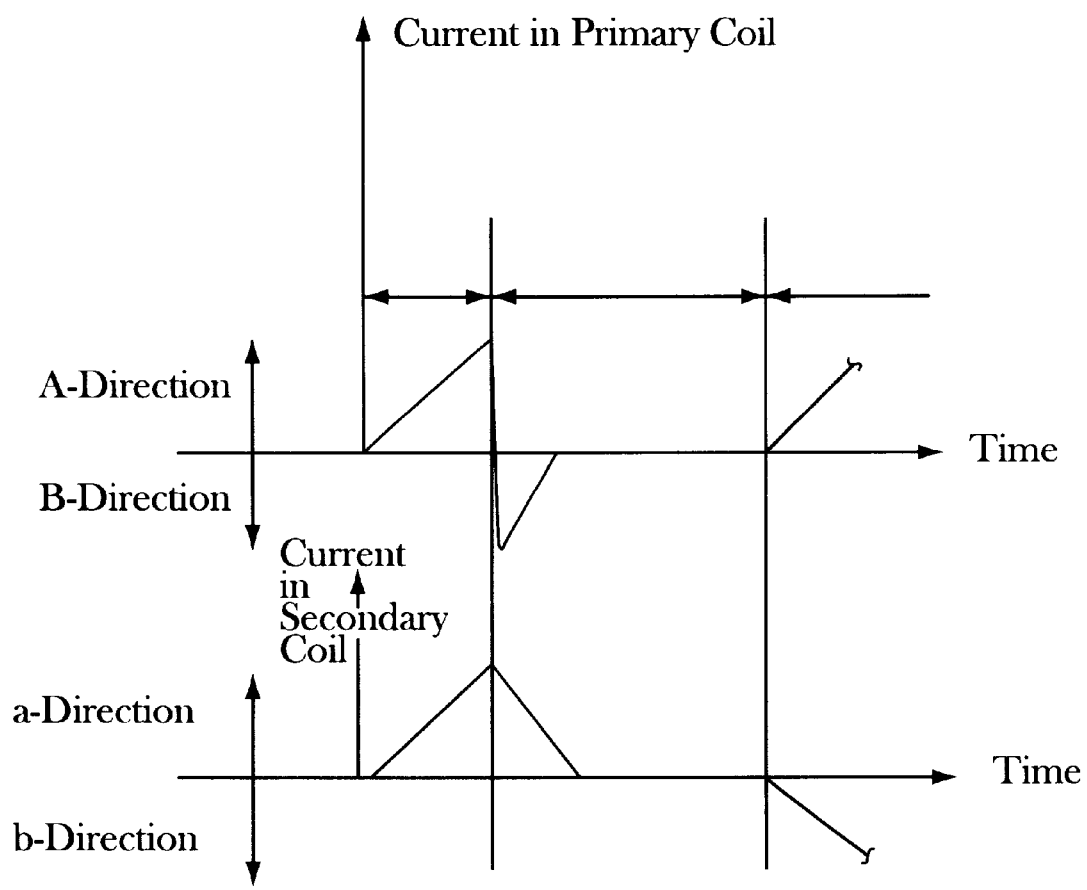
FIG. 7 is a diagram showing the current in the primary and secondary coils when a DC resistance welding controller is connected to a resistance welder.

For DC resistance welder 60, the controller of the present invention operates as shown in FIG. 7. In the first state (first and fourth transistors 21, 24 are ON), the current level gradually increases from zero as current flows into current detection circuit 42 in the A-direction (from power supply 12 to first transistor 21 to primary coil 91 (a-direction) to fourth transistor 24 to power supply 12). The current level of current flowing through secondary coil 72 in the a'-direction also increases gradually from zero.

When the sequence goes to the second state (all transistors 21, 22, 23, 24 are OFF), current flowing through primary coil 71 of transformer 70 is interrupted. As is the case for AC resistance welder 80, current continues to flow on the secondary coil 72 side of transformer 70 as it does in the first state. Nevertheless, in this case, on the secondary coil 72 side, current flows in a loop including: one end of secondary coil 72, first electrode 61, second electrode 62, the center of second coil 72, the other end of secondary coil 72, and first electrode 61, as described above.

Thus, in secondary coil 72, current flows from the center to both ends. Current in primary coil 71 induced by current flowing through secondary coil 72 is canceled in the a- and b-directions and little current flows on the primary coil 71 side. Therefore, on the primary coil 71 side, current remaining within the coil of current detection circuit 24 flows independently from current flowing on the secondary coil 72 side in the following order as capacitor 50 is charged: primary coil 71, third diode 33, capacitor 50, second diode 32, and primary coil 71.

Current gain is so small that current stops flowing shortly. On the secondary coil 72 side, current continues to flow independently from the current in primary coil 71. Unlike what happens for AC resistance welder 80, resistivity in the loop remains small and current does not stop flowing when capacitor 50 is charged completely. For this reason, on the secondary coil 72 side, current continues to flow in the second state, as shown in FIG. 6. Resistivity somewhat decreases current level.

The sequence goes to the third state (first and fourth transistors 21 and 24 are ON) with the above condition. The secondary coil 72 side is still conducting electricity, therefore, there is no chance for current flowing through primary coil 71 to induce current in secondary coil 72. As a result, amperage does not start from zero. It starts from a given value and increases gradually.

During the transition from the second to third state described above, the current level of current flowing in the primary coil 71 side (current flowing through current detection circuit 42) starts from zero for AC resistance welder 80. The current level starts from a given value, not zero, for DC resistance welder 60. For this reason, AC/DC tester 44 is able to determine the type of resistance welder, 60 or 80. Based on the result, AC/DC controller 40 turns on the DC or AC mode for the type of resistance welder 60 or 80. The specific sequence of how each of the resistance welders are controlled is the same as that of manual switching.

As described above, resistance welding controller 10 of the present invention can control both DC and AC resistance welders 60 and 80, providing an easy to use controller which does not require separate controllers for different resistance welders, 60 and 80. Also, the controller can automatically switch the mode based on the type of resistance welder, 60 or 80, eliminating the need for manual switching for different types of resistance welders, 60 and 80.

Figure 8A:
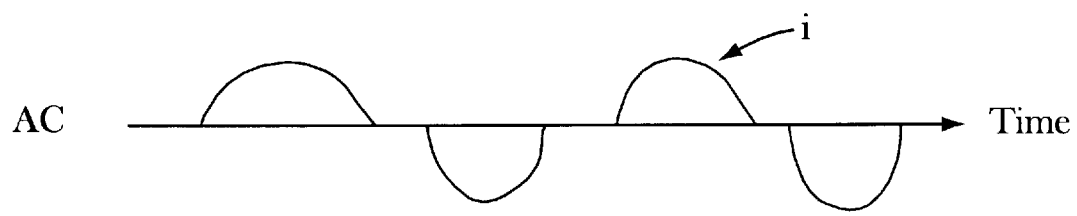
FIG. 8A shows an AC resistance welder primary current waveform according to the prior art.
Figure 8B:
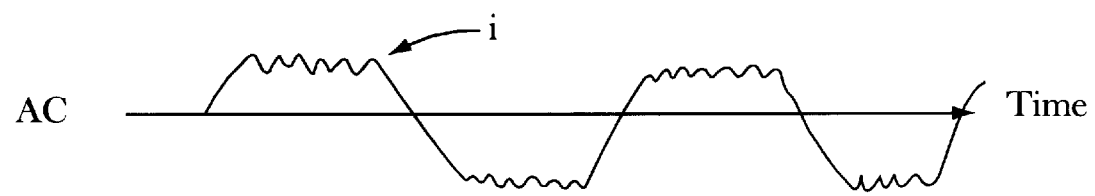
FIG. 8B shows an AC resistance welder primary current waveform according to the present invention.

The primary current as provided to welding controllers for AC resistance welders according to the prior art and the present invention is shown in FIGS. 8A and 8B, respectively.

Figure 12D:
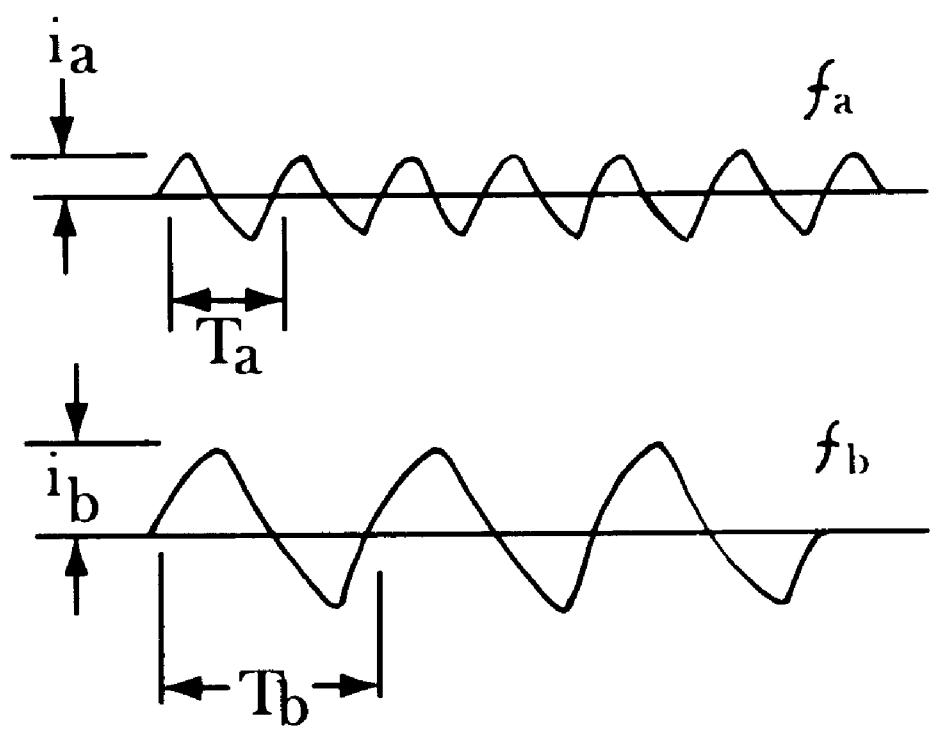
FIG. 12D shows how a variable frequency control method is performed.

According to the present invention, FIG. 12C shows the trapezoid wave form control method in which T is constant. FIG. 12D shows the variable frequency control method in which the following condition is fulfilled:

$$fa=1/Ta$$

$$fb=1/Tb$$

when fa>fb

Tz<Tb and current (i) is controlled by varying f(frequency).

FIG. 12B shows the pulse width modulation (PWM) in which the following condition is fulfilled:

$$f=1/T$$

In other words, frequency f is constant. Current is controlled by varying t.

For an AC resistance welder as shown in FIGS. 10, 12A, 12C, and 12D according to the present invention, the secondary current flow is substantially constant, thus electricity is efficiently used and welding performance is improved. This is in contrast to the prior art AC resistance welder primary current waveform shown in FIG. 12B.

Figure 9:
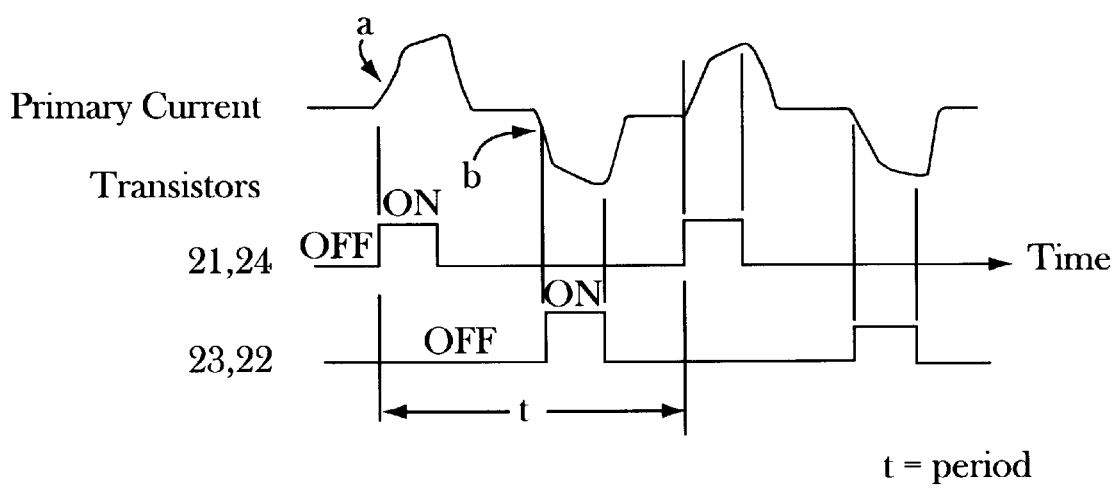
FIG. 9 shows the operation of a DC resistance welding controller according to the present invention.
Figure 10:
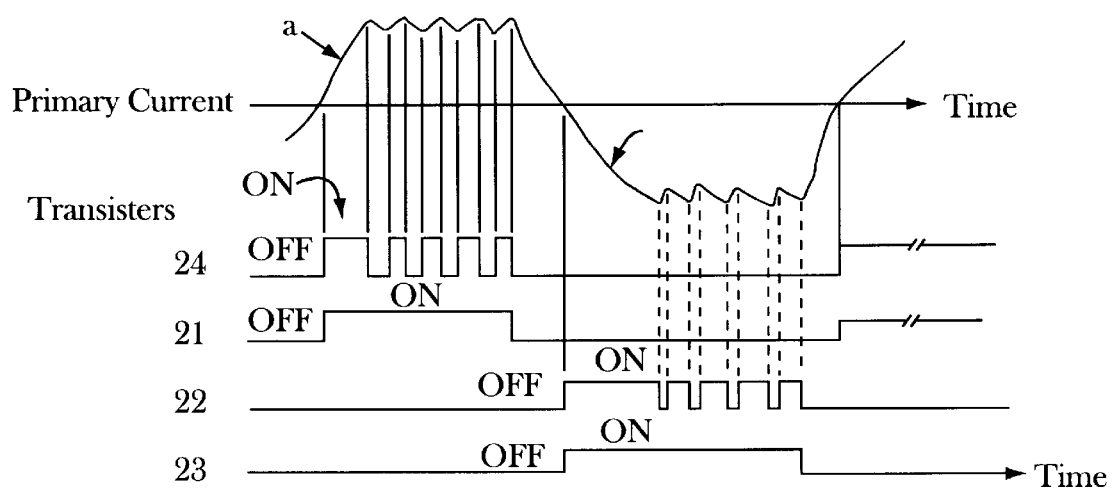
FIG. 10 shows the operation of an AC resistance welding controller according to the present invention.
Figure 11A:
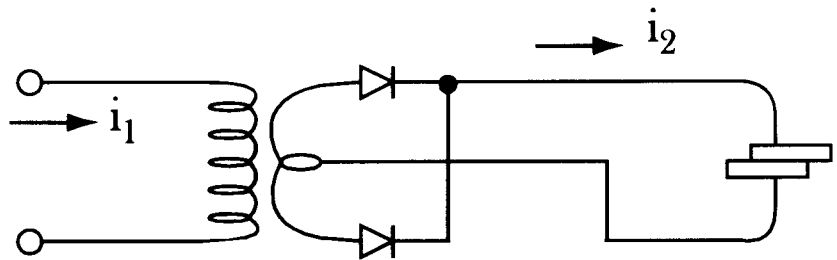
FIG. 11A shows a portion of a DC resistance welder.
Figure 11B:
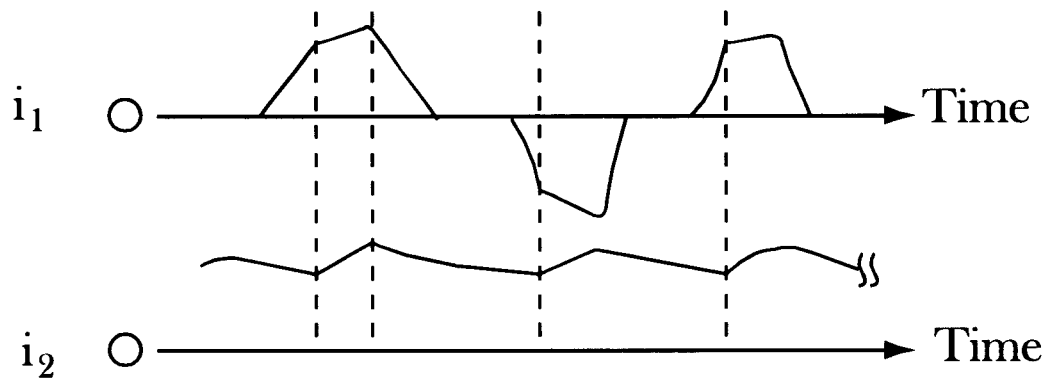
FIG. 11B shows DC resistance welder primary and secondary current waveforms according to the present invention.

For a DC welder, as shown in FIGS. 9, 11A, and 11B, the secondary current flows when the primary current does not flow, theoretically making better use of electricity than an interrupted power supply.

It will be understood that the foregoing is only illustrative of the principles of this invention, and that various modifications can be made by those skilled in the art without departing from the scope and spirit of the invention.

What is claimed is:

1. A resistance welding controller for supplying a given level of AC current to a resistance welder comprising:

a DC power supply; and an inverter, which converts DC power supply to AC current;

wherein the controller provides a dual control function by recognizing whether the resistance welder is the DC type such that AC current is provided for a DC welder by switching the polarity every time a pulse is generated by the carrier frequency of the inverter; AC current is provided for an AC welder by switching its polarity every time a predetermined number of pulses is detected by the carrier frequency of the inverter.

2. The resistance welding controller of claim 1 wherein the inverter switches modes based on whether the resistance welder is the AC or DC type.

3. The resistance welding controller of claim 1 wherein DC current is controlled by the pulse width modulation (PWM) method or variable frequency control method.

4. The resistance welding controller of claim 1 wherein AC current is controlled by a trapezoid wave which provides a substantially constant welding performance.

5. A resistance welding controller for supplying a given level of AC current to a resistance welder comprising:

a DC power supply; and an inverter, which converts DC power supply to AC current;

a checking means by which the controller checks whether the resistance controller is a DC welder or AC welder when a welding current is applied between a pair of electrodes;

wherein the controller provides a dual control function based on the result of the checking such that, for a DC welder, AC current is provided by switching the polarity every time a pulse is generated by the carrier frequency of the inverter;

an AC welder, AC current is provided by switching its polarity every time a predetermined number of pulses are detected by the carrier frequency of the inverter.

6. The resistance welding controller of claim 5 wherein the testing function in which the controller checks whether the resistance welder is the AC type or DC type is based on the wave form of the initial primary current.

7. The resistance welding controller of claim 5 wherein the testing function in which the controller checks whether the resistance welder is the AC type or DC type based on the wave form of the trial primary current that is provided for testing.

8. The resistance welding controller of claim 5 wherein DC current is controlled by the PWM method or variable frequency method.

9. The resistance welding controller of claim 5 wherein AC current is controlled by the trapezoid wave form which supplies substantially constant welding performance.

* * * * *